(12) United States Patent
Ryan et al.

(10) Patent No.: US 10,808,742 B2
(45) Date of Patent: *Oct. 20, 2020

(54) NAIL WITH A HEAD HAVING AN INWARDLY CURVED TOP SURFACE

(71) Applicant: Illinois Tool Works Inc., Glenview, IL (US)

(72) Inventors: Patrick Ryan, Arlington Heights, IL (US); Genaro Cortez, Bolingbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,408

(22) Filed: Jun. 20, 2019

(65) Prior Publication Data

US 2019/0301511 A1    Oct. 3, 2019

Related U.S. Application Data

(63) Continuation of application No. 15/439,884, filed on Feb. 22, 2017, now Pat. No. 10,371,189.

(51) Int. Cl.
*F16B 15/02* (2006.01)
*F16B 15/06* (2006.01)

(52) U.S. Cl.
CPC .............. *F16B 15/02* (2013.01); *F16B 15/06* (2013.01)

(58) Field of Classification Search
CPC .......... F16B 15/00; F16B 15/02; F16B 15/06; E01B 9/06
USPC ................................. 411/481, 486, 487, 494
See application file for complete search history.

(56) References Cited

U.S. PATENT DOCUMENTS

| D10,057 S | 6/1877 | Krickl |
| 257,351 A | 5/1882 | Lubin |
| 348,126 A | 8/1886 | Jones |
| 364,302 A | 6/1887 | Rogers |
| 364,439 A | 6/1887 | Rogers |
| 368,687 A | 8/1887 | Rogers |
| D18,491 S | 7/1888 | Jones |
| 398,260 A | 2/1889 | Husted |

(Continued)

FOREIGN PATENT DOCUMENTS

WO    WO 2012/098415    7/2012

OTHER PUBLICATIONS

Australian Examination Report No. 1 for Australian Application No. 2017201293, dated Mar. 29, 2018 (5 pages).

(Continued)

*Primary Examiner* — Roberta S Delisle
(74) *Attorney, Agent, or Firm* — Neal, Gerber & Eisenberg LLP

(57) ABSTRACT

Various embodiments of the present disclosure provide a nail with a head having an inwardly curved top surface. In one embodiment, the nail has a longitudinal axis and comprises a head, a shank, and a tip. The head includes a top portion and a bottom portion. The top portion includes an inwardly curved top surface forming a partially spherical cavity, while the bottom portion includes a radially inwardly tapered annular bottom surface. The shank is integrally connected to and extends from the bottom portion of the head. The tip is integrally connected to and extends from the shank and terminates in a free end.

19 Claims, 3 Drawing Sheets

(56) References Cited

U.S. PATENT DOCUMENTS

| | | |
|---|---|---|
| 410,698 A | 9/1889 | Rogers |
| 1,375,633 A | 4/1921 | Hamilton |
| 1,428,247 A | 9/1922 | Morris |
| 1,497,859 A | 6/1924 | Lilly |
| 1,591,810 A | 7/1926 | Dobbs |
| 1,623,465 A | 4/1927 | Curtis |
| 1,625,911 A | 4/1927 | Richards |
| 1,656,333 A | 1/1928 | Lund |
| 1,751,800 A | 3/1930 | Dickson |
| 1,801,077 A | 4/1931 | Gentry |
| D101,973 S | 11/1936 | Schuster |
| 2,086,086 A | 7/1937 | Raoul |
| 2,093,610 A | 9/1937 | Kraemer |
| 2,126,585 A | 8/1938 | Stone |
| 2,317,231 A | 4/1943 | Swedman |
| 2,353,110 A | 7/1944 | Camp |
| 2,558,379 A | 6/1951 | Phipard, Jr. |
| 2,864,276 A | 12/1958 | Parker |
| D188,950 S | 10/1960 | Miller |
| 3,009,382 A | 11/1961 | Salka |
| D197,188 S | 12/1963 | Anderson |
| 3,112,667 A | 12/1963 | Brentlinger |
| D211,661 S | 7/1968 | Holob |
| 3,459,095 A | 8/1969 | Luciano |
| 3,606,344 A | 9/1971 | Ball |
| D233,018 S | 10/1974 | Strayer |
| 3,861,527 A | 1/1975 | Perkins |
| 3,921,496 A | 11/1975 | Helderman |
| 3,922,828 A | 12/1975 | Patton |
| 4,011,785 A | 3/1977 | Schrepferman |
| 4,516,780 A | 5/1985 | Tabet |
| 4,588,152 A | 5/1986 | Ruehl |
| 4,687,393 A | 8/1987 | Thompson |
| 4,718,802 A * | 1/1988 | Rockenfeller .......... F16B 15/06 411/421 |
| 4,781,508 A | 11/1988 | Schroeder |
| 4,927,309 A | 5/1990 | Sygnator |
| 5,178,503 A | 1/1993 | Losada |
| 5,188,496 A | 2/1993 | Giannuzzi |
| 5,329,653 A | 7/1994 | Hultgren |
| 5,391,029 A | 2/1995 | Fardell |
| 5,562,376 A | 10/1996 | Fischer |
| 5,571,055 A | 11/1996 | Lewis |
| 5,709,332 A | 1/1998 | Coop |
| 5,810,534 A * | 9/1998 | Carlisle ................... F16B 15/06 411/455 |
| D482,086 S | 11/2003 | Metz |
| 6,789,989 B2 | 9/2004 | Walther |
| D517,622 S | 3/2006 | Barouh |
| 7,207,761 B2 * | 4/2007 | Dill ........................ F16B 15/06 411/440 |
| D572,323 S | 7/2008 | Merullo |
| D601,004 S * | 9/2009 | Hagins ........................... D8/387 |
| D614,942 S | 5/2010 | Gaudron |
| D637,071 S | 5/2011 | Gaudron |
| 8,740,956 B2 | 6/2014 | Smith |
| D733,547 S | 7/2015 | Mazur |
| D843,201 S * | 3/2019 | Morey ........................ D8/391 |
| D856,788 S * | 8/2019 | Morey ........................ D8/391 |
| 2003/0024194 A1 | 2/2003 | Schmid |
| 2004/0047713 A1 | 3/2004 | Jung |
| 2007/0025829 A1 | 2/2007 | Sutt, Jr. |
| 2008/0019798 A1 | 1/2008 | Lee |
| 2008/0175689 A1 | 7/2008 | Vagedes |
| 2009/0155021 A1 | 6/2009 | Versino |
| 2009/0290957 A1 | 11/2009 | Ho |
| 2011/0182695 A1 | 7/2011 | Beck |
| 2013/0174629 A1 | 7/2013 | Kim |
| 2015/0071734 A1 | 3/2015 | Vallejo |
| 2016/0186793 A1 | 6/2016 | Walworth |
| 2016/0278834 A1 | 9/2016 | Bayer et al. |
| 2016/0312814 A1 | 10/2016 | Gabriel |
| 2017/0030392 A1 | 2/2017 | Taneichi |
| 2017/0129196 A1 | 5/2017 | Zhu |
| 2017/0298974 A1 | 10/2017 | Sutt, Jr. |
| 2018/0298577 A1 * | 10/2018 | Morey ..................... A01G 9/28 |

OTHER PUBLICATIONS

International Search Report and Written Opinion for International Application No. PCT/US2018/012924, dated May 28, 2018 (11 pages).

* cited by examiner

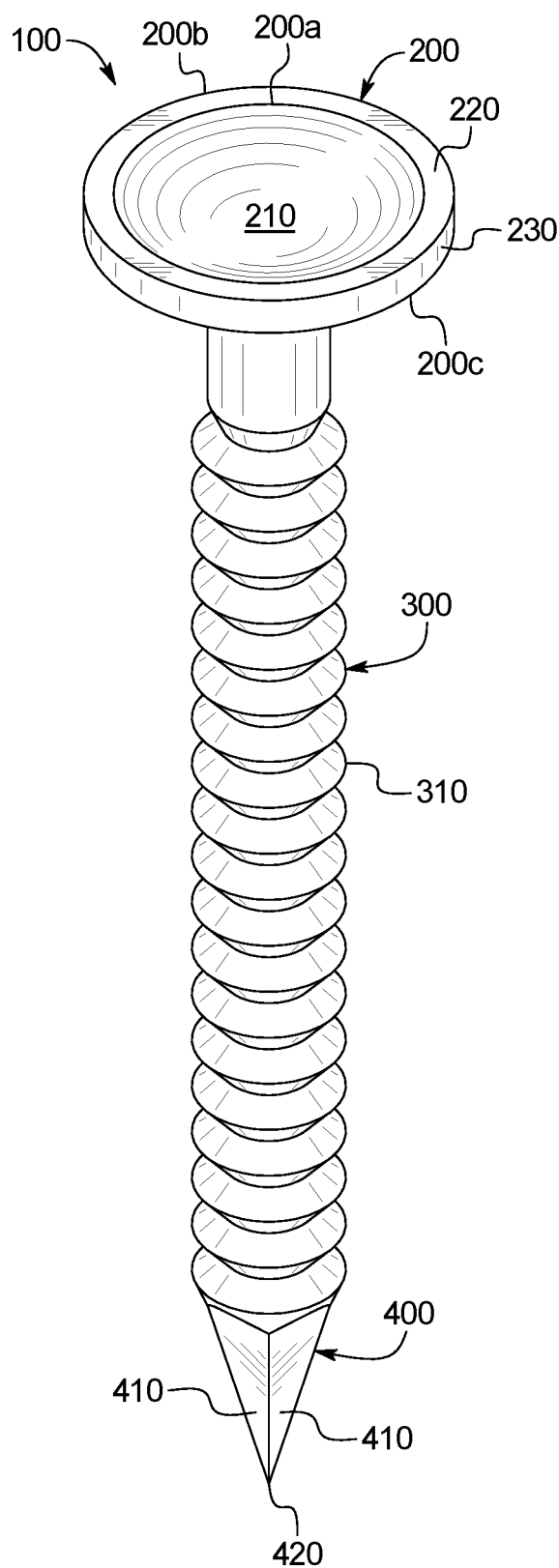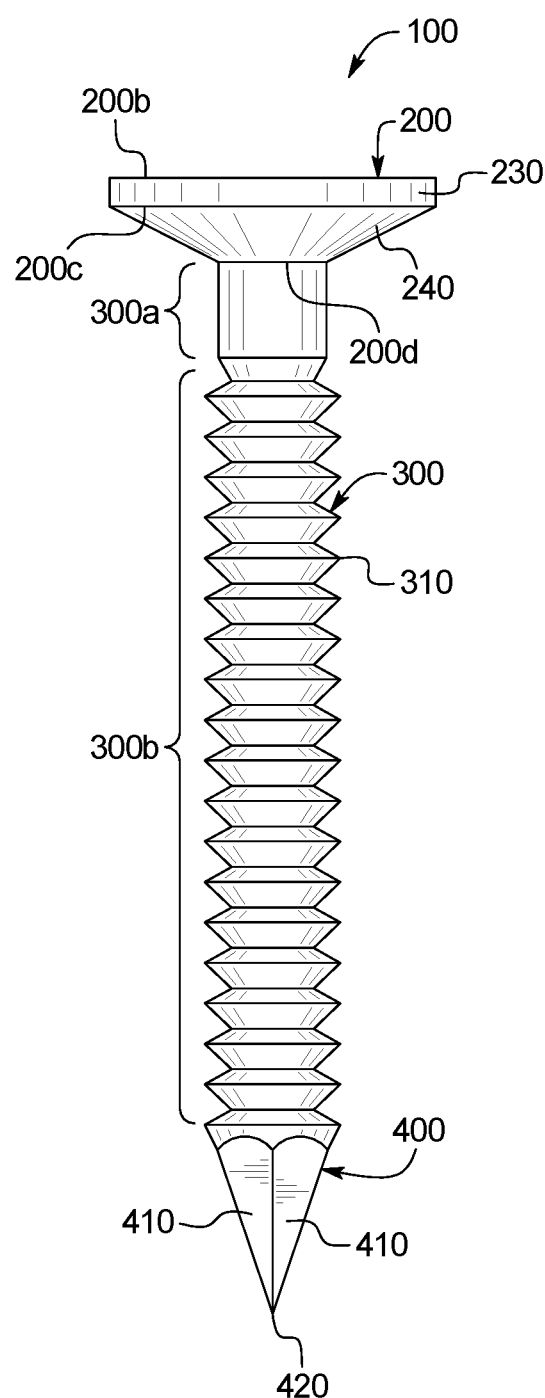
FIG. 1
FIG. 2

US 10,808,742 B2

NAIL WITH A HEAD HAVING AN INWARDLY CURVED TOP SURFACE

PRIORITY CLAIM

This patent application is a continuation of, and claims priority to and the benefit of, U.S. patent application Ser. No. 15/439,884, filed on Feb. 22, 2017, the entire contents of which is incorporated herein by reference.

CROSS-REFERENCE TO RELATED APPLICATIONS

This application is related to the following commonly owned co-pending patent application: U.S. application Ser. No. 29/674,116, entitled "NAIL WITH A HEAD HAVING AN INWARDLY CURVED TOP SURFACE,".

The present disclosure relates to fasteners and, more particularly, to an improved nail.

Nails are well known and commercially used throughout the world to secure objects to one another or to secure an object to a substrate. A typical nail includes a head, a shank integrally connected to and extending from the head, and a tip integrally connected to and extending from the shank and terminating in a pointed free end. The head of a typical nail is shaped like a pancake, and includes a flat circular upper surface, a cylindrical side surface integrally connected to the outer edge of the upper surface, and a flat annular lower surface integrally connected to the cylindrical side surface.

Nails are commonly used to attach gypsum board or drywall to a substrate, such as lumber. The exterior surface of the gypsum board is generally flat and lies in an exterior plane. When a nail is used to attach the gypsum board to the substrate, the head of the nail is preferably recessed below the exterior plane and into the gypsum board. The space between the recessed head and the exterior plane is later filled with joint compound and sanded to provide a smooth finished exterior surface.

Using this known nail to attach gypsum board to a substrate causes two problems.

First, the flat annular lower surface of the head of a known nail commonly tears the outer paper of the exterior surface of the gypsum board. This complicates applying joint compound and in certain cases damages the gypsum board beyond repair. This increases the time spent working on the project and could also result in wasted material.

Second, the flat circular upper surface can cause a nail pop in the finished wall. Relative movement between the nail and the gypsum board (e.g., due to swelling and contraction of the lumber substrate in varying temperatures) can cause the nail to push an area of the gypsum board outward (thereby creating a protruding nail pop) or pull an area of the gypsum board inward (thereby creating a dimple nail pop). Nail pops are unsightly and take time to fix.

There is a need for improved nails that remedy these problems.

SUMMARY

Various embodiments of the present disclosure provide a nail with a head having an inwardly curved top surface that solves the above problems. In one embodiment, the nail has a longitudinal axis and comprises a head, a shank, and a tip. The head includes a top portion and a bottom portion. The top portion includes an inwardly curved surface forming a partially spherical cavity, while the bottom portion includes a radially inwardly tapered annular bottom surface. The shank is integrally connected to and extends from the bottom portion of the head. The tip is tip integrally connected to and extends from the shank and terminates in a free end.

The nail of the present disclosure solves the above problems. When the inwardly tapered annular bottom surface of the nail head contacts the exterior surface of the gypsum board as the nail is driven into the gypsum board, it smoothly draws the outer paper inward along the tapered contour without tearing it. This ensures tear-free nail driving under normal circumstances. This also enables the nail head to be driven below the surface of the gypsum board without tearing the paper, and the inwardly curved top surface provides a cavity into which joint compound can be applied. This results in a smooth finished wall. Additionally, use of the nail to secure the gypsum board to the substrate eliminates forms a more secure attachment when compared to conventional nails, which reduces the likelihood of nail pops, and also eliminates air pockets between the gypsum board and the substrate and the underside of the nail head and the substrate, which also reduces the likelihood of nail pops.

Other objects, features, and advantages of the present disclosure will be apparent from the detailed description and the drawings.

BRIEF DESCRIPTION OF THE FIGURES

FIG. 1 is a top-perspective view of one example embodiment of the nail of the present disclosure.
FIG. 2 is a front-elevational view of the nail of FIG. 1.

DETAILED DESCRIPTION

FIGS. 1-5 illustrate one example nail 100 of the present disclosure with a head with an inwardly curved top surface. The nail 100 is sized and shaped to fasten gypsum board or drywall to lumber (though it may be used in any other suitable manner). The nail 100 has a longitudinal axis A and includes a head 200, a shank 300 connected to and extending from the head 200, and a tip 400 connected to and extending from the shank 300.

Figure 3:
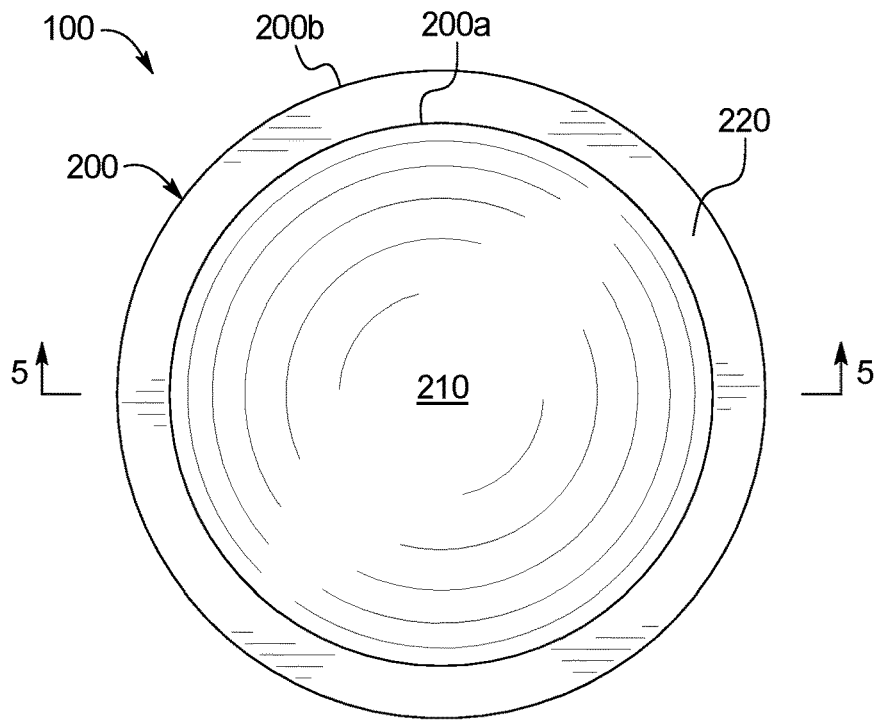
FIG. 3 is a top-plan view of the nail of FIG. 1.
Figure 4:
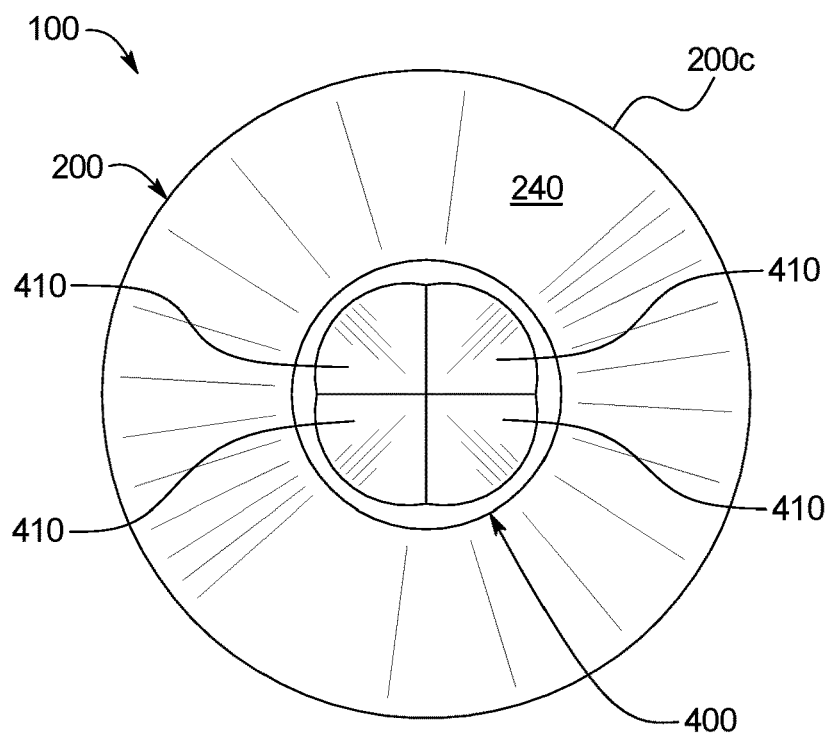
FIG. 4 is a bottom-plan view of the nail of FIG. 1.
Figure 5:
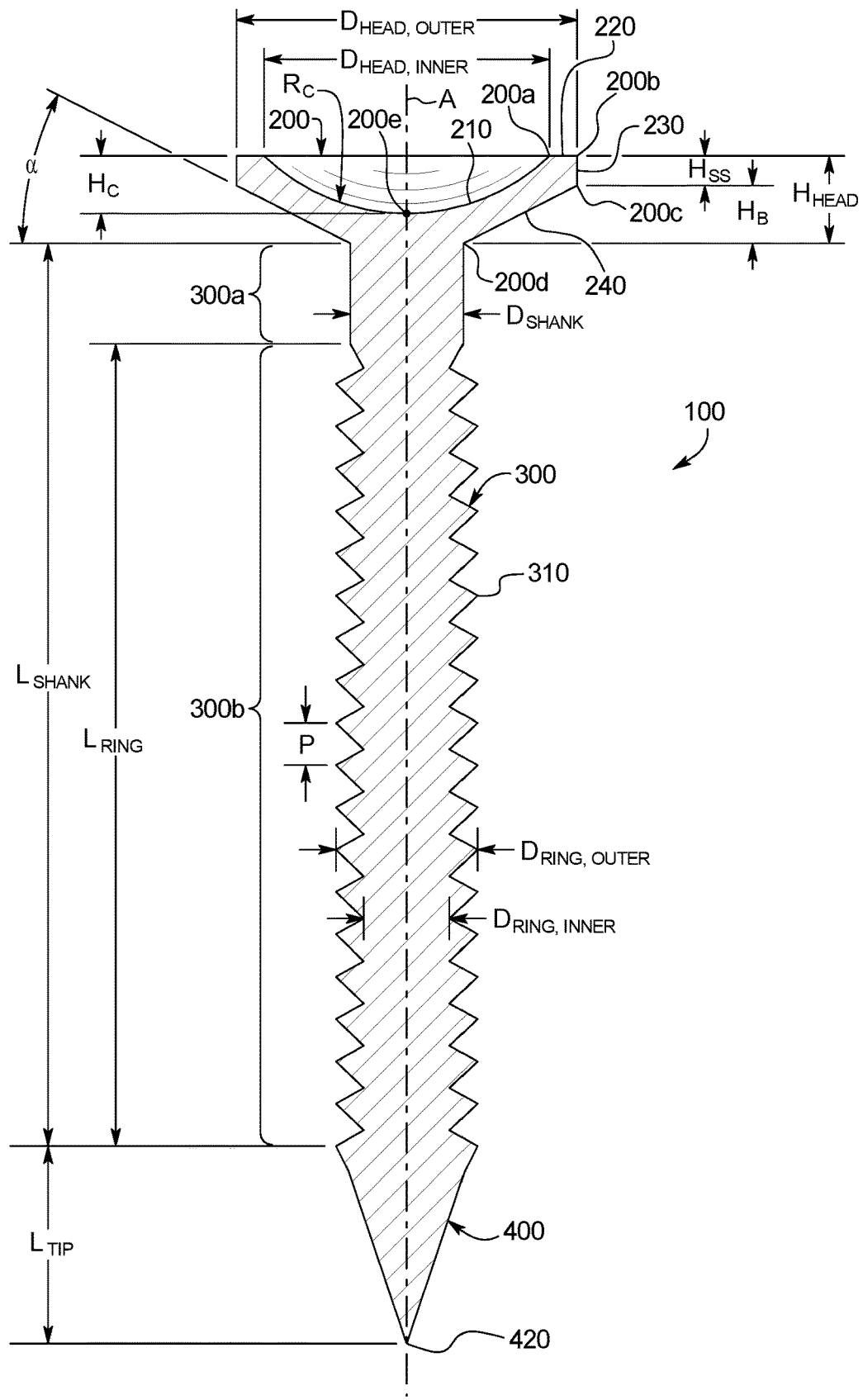
FIG. 5 is a cross-sectional-front-elevational view of the nail of FIG. 1 taken substantially along line 5-5 of FIG. 3.

The head 200 includes a top surface (not labeled) including an inwardly curved surface 210 and an annular rim surface 220, a cylindrical side surface 230, and a radially inwardly tapered annular bottom surface 240. A top portion of the head 200 includes the top surface (including the inwardly curved surface 210 and the annular rim surface 220) and the cylindrical side surface 230, and a bottom portion of the head includes the radially inwardly tapered annular bottom surface 240. As best shown in FIG. 5, the head 400 has a height $H_{HEAD}$, which is 1.4-2.0 millimeters in this example embodiment (though it may be any suitable value in other embodiments). The head also has an outer diameter $D_{HEAD, OUTER}$, which is 7.2-7.5 millimeters in this example embodiment (though it may be any suitable range of values in other embodiments).

The inwardly curved surface 210 has a trough or bottom-most point 200e, and a circular edge 200a defines a periphery of the inwardly curved surface 210. The inwardly curved surface 210 is centered on the longitudinal axis A such that the longitudinal axis A intersects the trough or bottom point of the inwardly curved surface 200e and such that all points along the circular edge 200a are equidistant from the longitudinal axis. In this example embodiment, the inwardly curved surface 210 curves inwardly toward the tip 400 and has a radius $R_C$, which is 6.5 millimeters (though it may be any suitable value in other embodiments). The curvature is circumferentially uniform such that the inwardly curved surface 210 defines a rounded cavity shaped like a partial sphere. Put differently, the inwardly curved surface 210 is symmetrical about the longitudinal axis A such that the profile the inwardly curved surface 210 forms when viewed in cross-section is identical for all planes including the longitudinal axis A. The circular edge 200a has a diameter $D_{HEAD,\ INNER}$, which is equal to 13 millimeters in this example embodiment (though it may be any suitable value in other embodiments). The inwardly curved surface 210 has a height $H_C$, which is 0.5-1.0 millimeters in this example embodiment (though it may be any suitable range of values in other embodiments).

The annular rim surface 220 extends from the circular edge 200a, which defines an inner circular edge of the annular rim surface 220, to a circular edge 200b, which defines an outer circular edge of the annular rim surface 220. The annular rim surface 220 is integrally connected to the inwardly curved surface 210 at the circular edge 200a. The circular edge 200b has the diameter $D_{HEAD,\ OUTER}$.

In various embodiments the inwardly curved surface 210 and the annular rim surface 220 are shaped such that a driver blade having an outwardly curved driving tip can engage part of both the inwardly curved surface 210 and the annular rim surface 220 when driving the nail 100 into a substrate.

The cylindrical side surface 230 extends from the circular edge 220b, which defines an upper circular edge of the cylindrical side surface 230, to a circular edge 220c, which defines a lower circular edge of the cylindrical side surface 230. The cylindrical side surface 230 is integrally connected to the annular rim surface 220 at the circular edge 200b. The circular edge 220c has the diameter $D_{HEAD,\ OUTER}$. The cylindrical side surface 230 has a height $H_{SS}$, which is 0.09 millimeters in this example embodiment (though it may be any suitable range of values in other embodiments).

The inwardly tapered annular bottom surface 240 extends from the circular edge 200c, which defines an upper circular edge of the inwardly tapered annular bottom surface 240, to a circular edge 200d, which defines a lower circular edge of the inwardly tapered annular bottom surface 240. The inwardly tapered annular bottom surface 240 is integrally connected to the cylindrical side surface 230 at the circular edge 200c. The inwardly tapered annular bottom surface 240 tapers radially inwardly and toward the tip over a height $H_B$ at an angle α, culminating in the circular edge 200b, which has a diameter $D_{SHANK}$. In this example embodiment, the height $H_B$ is 1.1 millimeters (though it may be any suitable value in other embodiments), the diameter $D_{SHANK}$ is 2.77-2.80 millimeters (though it may be any suitable range of values in other embodiments), and the angle α is 57 degrees (though it may be any suitable value in other embodiments).

The shank 300 has a length $L_{SHANK}$, which is 58.0-60.6 millimeters in this example embodiment (though it may be any suitable range of values in other embodiments). The shank 300 includes a cylindrical shank portion 300a and a ring shank portion 300b.

The top end of the cylindrical shank portion 300a is integrally connected to the lower circular edge of the inwardly tapered annular bottom surface 240. The cylindrical shank portion 300a has the diameter $D_{SHANK}$.

The top end of the ring shank portion 300b is integrally connected to the bottom end of the cylindrical shank portion 300a. The ring shank portion 300b includes multiple rings 310 adjacently arranged along the longitudinal axis A and that each taper radially outwardly from an inner diameter $D_{RING,\ INNER}$ to an outer diameter $D_{RING,\ OUTER}$ and back radially inwardly to the inner diameter Di. A distance P separates the outermost points of adjacent rings 310. In this example embodiment, $D_{RING,\ OUTER}$ is 2.80 millimeters (though it may be any suitable range of values in other embodiments), $D_{RING,\ INNER}$ is 2.67 millimeters (though it may be any suitable range of values in other embodiments), and P is 0.90-1.10 millimeters (though it may be any suitable range of values in other embodiments).

The tip 400 is integrally connected to the bottom end of the ring shank portion 300b and has a length $L_{TIP}$, which is 3.75 millimeters in this example embodiment (though it may be any suitable range of values in other embodiments). The tip 400 includes multiple flats 410 that taper radially inwardly to a point 420. In this example embodiment, the tip 400 is a chisel-point tip, though the tip may be any form of tip in other embodiments.

This example nail 100 is made of electrogalvanized steel, though it may be made of any other suitable material, such as nongalvanized low-carbon steel.

The nail 100 is by: (1) clamping a wire rod to form the rings 310; then (2) striking one end of the rod to form the head 200; then (3) cutting the nail to length while forming the pointed tip 400.

The nail of the present disclosure solves the above problems. When the inwardly tapered annular bottom surface of the nail head contacts the exterior surface of the gypsum board as the nail is driven into the gypsum board, it smoothly draws the outer paper inward along the tapered contour without tearing it. This ensures tear-free nail driving under normal circumstances. This also enables the nail head to be driven below the surface of the gypsum board without tearing the paper, and the inwardly curved top surface provides a cavity into which joint compound can be applied. This results in a smooth finished wall. Additionally, use of the nail to secure the gypsum board to the substrate eliminates forms a more secure attachment when compared to conventional nails, which reduces the likelihood of nail pops, and also eliminates air pockets between the gypsum board and the substrate and the underside of the nail head and the substrate, which also reduces the likelihood of nail pops.

Various changes and modifications to the above-described embodiments described herein will be apparent to those skilled in the art. These changes and modifications can be made without departing from the spirit and scope of this present subject matter and without diminishing its intended advantages. Not all of the depicted components described in this disclosure may be required, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. A nail having a longitudinal axis and comprising:
a head including a top portion and a bottom portion, the top portion including an inwardly curved surface forming a partially spherical cavity, the bottom portion including a radially inwardly tapered annular bottom surface;
a shank integrally connected to and extending from the bottom portion of the head, the shank including a cylindrical shank portion and a ring shank portion including a plurality of rings adjacently arranged along the longitudinal axis, wherein each of the plurality of rings includes a first surface and a second surface that meet at an outer ring point, wherein for each of a plurality of the rings, the second surface of that ring meets the first surface of an adjacent one of the rings; and
a tip integrally connected to and extending from the shank and terminating in a free end.

2. The nail of claim 1, wherein the inwardly curved surface includes a circular peripheral edge and a bottom point.

3. The nail of claim 2, wherein the bottom point intersects the longitudinal axis.

4. The nail of claim 3, wherein the inwardly curved surface is symmetrical about the longitudinal axis such that all points along the circular peripheral edge are equidistant from the longitudinal axis.

5. The nail of claim 2, wherein the top portion of the head includes an annular rim surface integrally connected to the inwardly curved surface at the circular peripheral edge.

6. The nail of claim 5, wherein the head includes a cylindrical side surface integrally connected to the annular top surface.

7. The nail of claim 6, wherein the cylindrical side surface is integrally connected to the bottom surface.

8. The nail of claim 1, wherein each ring is centered on the longitudinal axis.

9. The nail of claim 1, wherein the cylindrical shank portion is disposed between the head and the ring shank portion.

10. The nail of claim 1, wherein each ring tapers radially outwardly relative to the longitudinal axis.

11. The nail of claim 1, wherein the free end is pointed.

12. The nail of claim 11, wherein the tip includes multiple flats that taper to the pointed free end.

13. A nail having a longitudinal axis and comprising:
a head including a top portion and a bottom portion, the top portion including an inwardly curved surface forming a partially spherical cavity, the bottom portion including an annular bottom surface;
a shank integrally connected to and extending from the bottom portion of the head, the shank including a ring shank portion including a plurality of rings adjacently arranged along the longitudinal axis, wherein each of the plurality of rings includes a first surface and a second surface that meet at an outer ring circular edge, wherein for each of a plurality of the rings, the second surface of that ring meets the first surface of an adjacent one of the rings; and
a tip integrally connected to and extending from the shank and terminating in a free end.

14. The nail of claim 13, wherein the inwardly curved surface is symmetrical about the longitudinal axis.

15. The nail of claim 14, wherein each ring is centered on the longitudinal axis.

16. The nail of claim 13, wherein each ring tapers radially outwardly relative to the longitudinal axis.

17. A nail having a longitudinal axis and comprising:
a head including a top portion and a bottom portion, the top portion including an inwardly curved surface forming a partially spherical cavity;
a shank integrally connected to and extending from the bottom portion of the head, the shank including a ring shank portion including a plurality of rings adjacently arranged along the longitudinal axis, wherein each of the plurality of rings includes a first surface and a second surface that meet at an outer ring circular edge point, wherein for each of a plurality of the rings, the second surface of that ring meets the first surface of an adjacent one of the rings; and
a tip integrally connected to and extending from the shank and terminating in a free end.

18. The nail of claim 17, wherein the inwardly curved surface is symmetrical about the longitudinal axis.

19. The nail of claim 17, wherein each ring tapers radially outwardly relative to the longitudinal axis.

* * * * *